United States Patent [19]
Kimura et al.

[11] 3,931,386
[45] Jan. 6, 1976

[54] PROCESS FOR PRODUCING DRAWN OR UNDRAWN FLAME-RESISTANT, ANTI-FUSING CURED PHENOLIC CONTINUOUS FILAMENTS

[75] Inventors: Isao Kimura, Suita; Hiroaki Koyama, Osaka, both of Japan

[73] Assignee: Nippon Kynol Incorporated, Osaka, Japan

[22] Filed: Oct. 30, 1972

[21] Appl. No.: 302,010

[30] Foreign Application Priority Data

Nov. 6, 1971  Japan .............................. 46-88433

[52] U.S. Cl. ............ 264/236; 260/841; 264/176 F; 264/347
[51] Int. Cl.² ........................................ B29C 25/00
[58] Field of Search .................... 260/59 R, 57, 841; 264/176, 236, 210 F, 347

[56] References Cited
UNITED STATES PATENTS

| | | | |
|---|---|---|---|
| 2,142,007 | 12/1938 | Schlack | 264/78 |
| 2,168,335 | 8/1939 | Heckert | 264/78 |
| 2,376,511 | 5/1945 | Saunders et al. | 264/210 F |
| 2,378,667 | 6/1945 | Vaala | 260/43 |
| 2,683,130 | 7/1954 | D'Alelio | 264/206 |
| 3,363,025 | 1/1968 | Fitko et al. | 260/841 |
| 3,651,199 | 3/1972 | Blume et al. | 264/210 F |
| 3,716,521 | 2/1973 | Economy et al. | 264/176 F |
| 3,723,588 | 3/1973 | Economy et al. | 264/176 F |
| 3,808,289 | 4/1974 | Okuhashi et al. | 260/841 |

FOREIGN PATENTS OR APPLICATIONS

| | | | |
|---|---|---|---|
| 44-3506 | 2/1969 | Japan | 264/176 F |
| 40-5927 | 3/1965 | Japan | 264/176 F |

OTHER PUBLICATIONS
Alien Prop. Ser. No. 375,537 Ubbelohyde 4–27–1943.

*Primary Examiner*—Jay H. Woo
*Attorney, Agent, or Firm*—Sherman & Shalloway

[57] ABSTRACT

A process for producing a drawn or undrawn flame-resistant and anti-fusing cured phenolic continuous filament which comprises melt-spinning an uncured novolak resin which may contain a fiber-forming thermoplastic synthetic resin and then curing the melt-spun filament with a curing agent in the presence of a catalyst; characterized by pre-curing the melt-spun filament with an aldehyde as a curing agent in the presence of an acid catalyst, and then curing the pre-cured filament with an aldehyde in the presence of a basic catalyst.

13 Claims, No Drawings

PROCESS FOR PRODUCING DRAWN OR UNDRAWN FLAME-RESISTANT, ANTI-FUSING CURED PHENOLIC CONTINUOUS FILAMENTS

This invention relates to a process for producing a drawn or undrawn flame-resistant and anti-fusing cured phenolic continuous filament having light-colored appearance, good dyeability and improved yarn properties such as tenacity and elongation, by a shortened curing period.

Phenolic filaments have been disclosed, for example, in South African Pat. No. 6,901,356. The South African patent discloses that an uncured novolak resin is melt spun, and the spun filaments are dipped in an aqueous solution of a mixture of hydrochloric acid and formaldehyde for 10 and several hours, heated gradually and further boiled in an aqueous solution of a mixture of hydrochloric acid and formaldehyde, whereby the filaments are cured. According to this process, the yarn properties of the resulting filaments, such as tenacity and elongation, are not good enough and the color of the filaments is dark brown.

It was also proposed that in order to impart a high degree of elastic properties to a polyamide-filament, a molten mixture of a polyamide resin and a fusible phenol-formaldehyde resin in an amount up to 40% by weight of the polyamide resin is melt spun to produce filaments and the resulting filaments are cured using an alkali curing agent (Japanese Patent Publication No. 5927/65 published Mar. 25, 1965). The Patent points out that if the amount of the phenol-formaldehyde resin exceeds 25% by weight based on the polyamide resin, the spinnability or drawability of the resulting mixture is reduced, and adverse effects are exerted on the quality of the resulting filament, and in the sole Example in this Patent the amount of the phenol-formaldehyde resin is 10% by weight based on nylon 6.

For use as interior ornaments or clothes, phenolic filaments are required to have a light-colored appearance so that they can be dyed easily in various colors, in addition to having satisfactory tenacity and elongation and also highly flame-resistant and anti-fusing properties.

It has been found when a melt-spun filament of an uncured novolak resin which may contain a fiber-forming thermoplastic synthetic resin preferably in an amount less than 40% by weight, for example, 0.1 – 40% by weight based on the total weight of the novolak resin and the thermoplastic synthetic resin, is pre-cured with an aldehyde as a curing agent in the presence of an acid catalyst, and then the pre-cured filament is cured with an aldehyde in the presence of a basic catalyst, excellent flame-resistant and anti-fusing cured phenolic filaments having light-colored appearance, good dyeability, improved yarn properties such as tenacity and elongation can be produced within a shortened curing period.

Accordingly, the object of the present invention is to provide an improved process for producing a melt-spum drawn or undrawn cured phenolic continuous filament having excellent flame-resistant and anti-fusing properties, light-colored appearance, good dyeability, improved yarn properties such as tenacity and elongation by a simple and time-saving operation.

Many other objects and advantages of this invention will become apparent from the following description.

According to this invention, the uncured novolak resin which may contain a fiber-forming thermoplastic synthetic resin is melt-spun and then cured by a two-step process comprising the pre-curing step and the curing step.

The novolak resin is a resin which is uncured and fusible in the starting molten mixture, and can be cured with a curing agent after melt-spinning. The method of preparing the novolak resin itself is well known. It can be produced by reacting (polycondensing) a phenol with an aldehyde under heat in the presence of an acid catalyst. Usually, novolak resins have a number average molecular weight of about 300 to about 2,000. If desired, those having a larger molecular weight (for example, up to about 5,000) can be produced. Therefore, as is well known, mainly novolak-type modified novolak resins obtained by any desired combination of the novolak-type reaction and the resol-type reaction can also be used. Furthermore, any desired combinations of phenols and aldehydes can be used, and different novolak resins each derived from a different combination of phenol and aldehyde can be used conjointly.

The phenols used for producing the novolak resins are most commonly phenol and cresol. But other phenols can also be used. Examples of these phenols are phenol, o-cresol, m-cresol, p-cresol, 2,3-xylenol, 2,5-xylenol, 2,4-xylenol, 2,6-xylenol, 3,4-xylenol, 3,5-xylenol, o-ethylphenol, m-ethylphenol, p-ethylphenol, p-phenylphenyl, p-tertiary butyl phenol, p-tertiary amylphenol, bisphenol A, resorcinol, and mixtures of two or more of these with each other.

The aldehyde most commonly used for polycondensation with the above phenol is formaldehyde, but paraformaldehyde, benzaldehyde, hexamethylenetetramine, furfural and a mxiture thereof can also be utilized. These aldehydes may be used as a curing agent in this invention.

The acid catalyst used for the reaction of forming novolak resins may be any known organic or inorganic acids, for example, hydrochloric acid, nitric acid, sulfuric acid, phosphoric acid, formic acid, acetic acid, oxalic acid, or phthalic acid.

In this invention, the uncured novolak resin can be melt spun alone or in admixture with a fiber-forming thermoplastic synthetic resin. The thermoplastic synthetic resin may be added to the novolak resin in an amount of less than 40% by weight, for example, 0.1 to 40% by weight based on the total amount of the resin.

As the thermoplastic synthetic resin, polyamides, such as nylon-6, nylon-7, nylon-9, nylon-11, nylon-12, nylon-66, nylon-610, nylon-611, nylon-612, nylon-6T represented by the general formula

or nylon-11T represented by the general formula

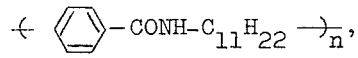

and copolymers consisting essentially of these polyamides; polyesters, such as polymethylene terephthalate, polyethylene terephthalate, polybutylene terephthalate, polyethylene oxyterephthalate, polycyclohexylene terephthalate and the like, and copolymers consisting essentially of these polyesters; polyolefins, such as polyethylene, polypropylene, polystyrene, polyvinylidene chloride, polyvinyl chloride and the like, and copolymers thereof; and various polyurethanes may be used. These thermoplastic polymers may be used in admixture.

According to this invention, the uncured melt-spun filaments obtained by melt-spining an uncured novolak resin which may contain a fiber-forming thermoplastic synthetic resin are pre-cured with an aldehyde as a curing agent in the presence of an acid catalyst.

The pre-curing of the melt-spun filament can be performed in various ways at a temperature from room temperature to 250°C. The temperature can be properly chosen within the above-mentioned range according to the type and amount of the novolak resin, the type and amount of the thermoplastic synthetic resin, the denier of the filament, the way in which the curing is performed, the type and amount of the curing agent, and the like.

In the most general embodiment, the melt-spun filament is immersed, or caused to run through, a bath containing an aldehyde as a curing agent in the presence of an acid catalyst. For example, the filaments are immersed in an aqueous solution of a mixture of an acid catalyst and an aldehyde for 5 to 20 hours at a temperature ranging from about 15° to 30°C. In another example, the filaments are immersed in the aqueous solution of said mixture and then the solution is gradually heated up to 40° to 105°C. for about 0.5 to 5 hours. This pre-curing may also be effected by contacting the filaments with a gaseous mixture of an acid catalyst and an aldehyde at a temperature from 30° to 105°C. Of course, these procedures may be combined. When the rate of raising temperature is higher than 200°C/hr, the filament dissolve or stick. Therefore, the temperature should not be raised at a rate of higher than 200°C/hr. The contacting between the filament and a liquid containing the curing agent is not limited to the method described, but other means such as spraying or fuming can also be utilized.

One example of the aqueous solution of the mixture of the aldehyde and acid catalyst is an aqueous solution containing 6.0 to 40% by weight, preferably 15 to 25% by weight, of the acid and 6.0 to 40% by weight, preferably 15 to 25% by weight of the aldehyde.

The aldehyde that is most commonly used is formaldehyde, but paraformaldehyde, benzaldehyde, hexamethylenetetramine, furfural and a mixture thereof may also be utilized.

The acid catalyst used in the present invention may be any known inorganic and organic acid, such as hydrochloric acid, sulfuric acid, nitric acid, acetic acid, oxalic acid, formic acid, orthophosphoric acid, butyric acid, lactic acid, benzenesulfonic acid, p-toluenesulfonic acid, or boric acid. Mixtures of these acids may also be used.

The pre-cured or partially cured filament is then cured with the aldehyde as described above in the presence of a basic catalyst.

The basic catalyst used in the present invention may be ammonia, ammonium hydroxide and amines for example, monoethanol amine, triethylene amine, a hydroxide or carbonate of a metal selected from the group consisting of alkali metals and alkaline earth metals, for example, sodium hydroxide, potassium hydroxide, calcium hydroxide, barium hydroxide, or sodium carbonate, and mixtures thereof. Hexamethylenetetramine can be used not only as curing agent but also as basic catalyst.

The curing of the pre-cured or partially cured filament is usually effected by contacting the filament with a mixture of the aldehyde and basic catalyst in the form of an aqueous solution, fume or vapor.

When this treatment is carried out by using the mixture in the form of an aqueous solution, the pre-cured filament is immersed in, or caused to run through, a bath containing the aldehyde and basic catalyst, at a temperature of about 15° to 40°C. Then the temperature is gradually raised up from 40° to 105°C. Preferably, the temperature is raised at a rate of less than 50° C/hr.

Alternatively, the pre-cured filaments are treated with the solution at 40° to 105°C for 15 to 90 minutes. Of course, temperature may be raised within this temperature range during the treatment. When the above described procedures are effected under pressure, the procedures may be effected at a temperature of higher than 105°C.

When the pre-cured filaments are treated in a gaseous mixture of the aldehyde and basic catalyst, the pre-cured filaments are treated at 30° to 105°C for 20 to 120 minutes. In this case, ammonia is usually used as the basic catalyst and formaldehyde, as the aldehyde.

It is most advantageous that the curing treatment using the basic catalyst is effected at 60° to 80°C for 30 to 60 minutes in an aqueous solution of formaldehyde and ammonia.

Concentrations of the aldehyde and the basic catalyst are varied depending upon the treating temperature, treating time and the like. However, the concentration of the aldehyde is usually 1 to 60% by weight, preferably 12 to 45% by weight, most preferably 20 to 35% by weight, and the concentration of the basic catalyst is usually 0.2 to 20% by weight, preferably 1 to 10% by weight, most preferably 2.0 to 3.5% by weight.

The reaction of novolak resin with formaldehyde in the presence of a basic catalyst proceeds at a considerably high reaction rate. However, uncured novolak filaments stick or dissolve in the surface under the above described atmosphere even at a relatively low temperature, such as lower than 50°C, due to their high reaction rate, and the filaments often lose their filamentary shape.

According to this invention, a surface layer of the uncured or uncross-linked novolak filaments are firstly pre-cured or pre-crosslinked to form a solvent- insoluble three-dimensional surface structure. The resulting three-dimensional structure will protect solvent-soluble uncured or uncross-linked internal or core portion of the filaments, and thus even when the filaments are exposed to the severest conditions, undesirable phenomena, such as sticking and dissolution, can be completely prevented.

That is, uncured or uncross-linked novolak filaments are firstly immersed in an aqueous solution of a mixture of, for example, formaldehyde and the acid catalyst or exposed to a gaseous mixture of them at a temperature lower than 105°C to form a three-dimensional structure on the surface layer of the filaments. The resulting pre-cured filaments are preferably washed wi ater and immediately immersed in an aqueous solution of a mixture of the basic catalyst and aldehyde or exposed to a gaseous mixture of them at a temperature lower than 120°C, whereby uncured or uncross-linked portion in the interior of the pre-cured filaments can be rapidly cross-linked, and infusible and flame-resistant phenolic fibers having high tenacity and elongation can be produced within a very shortened period, without the undesirable phenomena such as sticking and dissolution.

According to the method of the present invention, melt-spun filaments of uncured novolak resin are preliminarily cured with an aqueous solution of a mixture of the acid catalyst and aldehyde, whereby curing of the filaments with an aqueous solution of a mixture of the basic catalyst and aldehyde can be effected completely in a shortened period. Concentrations of the aldehyde, acid catalyst and basic catalyst are important requirements in order to attain the best results of the present invention.

In the aqueous solution of a mixture of the acid catalyst and aldehyde, when the concentration of the acid catalyst is lower than 6.0% by weight and that of the aldehyde is lower than 6.0% by weight, the pre-curing time is usually prolonged, and further the filaments tend to dissolve or stick. On the other hand, in the aqueous solution of a mixture of the acid catalyst and aldehyde, when the concentration of the acid catalyst is higher than 40% by weight and that of the aldehyde is higher than 40% by weight, the novolak filaments tend to dissolve and stick. Accordingly, the concentrations of from 6.0 to 40% by weight are prefered for both the acid catalyst and the aldehyde.

In the aqueous solution of a mixture of the basic catalyst and aldehyde, when the concentration of the basic catalyst is lower than 0.2% by weight and that of the aldehyde is lower than 1.0% by weight, the curing time is usually prolonged, and the resulting filaments tend to be lowered in tenacity and enlongation. Alternatively, when the concentration of the basic catalyst is higher than 20% by weight and that of the aldehyde is higher than 60% by weight, the filaments tend to dissolve or voids are formed in the filaments, whereby the filaments tend to become brittle. Therefore, the aldehyde concentration of from 1 to 60% by weight and the basic catalyst concentration of from 0.2 to 20% by weight are prefered.

The treating temperature in the curing of the pre-cured filaments using the basic catalyst is important to obtain the best results. When the treating temperature is lower than 40°C, even if novolak filaments pre-cured or partially cured with an aqueous solution of a mixture of the acid catalyst and aldehyde at a final treating temperature of 105°C are used, the curing time tends to be prolonged and moreover the strength of the cured filaments tends to be lowered. When the treating temperature is higher than 105°C, not only the distribution of the tenacity and elongation in the individual cured filaments is wide, but also it is difficult to provide a commercially acceptable product of the cured filaments. Accordingly, it is preferred to carry out the curing of the pre-cured filaments at a temperature ranging from 40° to 105°C.

After the curing, the cured filaments are washed with water and may be dried at 50° – 100°C. for 20 – 60 minutes.

In the present invention, filaments, the surface of which have been pre-cured with the aqueous solution of a mixture of the acid catalyst and aldehyde, have a red brown color tone, but when the pre-cured filaments are further treated with the aqueous solution of a mixture of the basic catalyst and aldehyde, the treated filaments have a light yellow color tone.

The melt-spinning apparatus and operation are well known, and the description of them will be omitted in this specification.

The known treatments, such as filtration or defoaming, of the molten mixture can be performed at any time before the molten mixture reaches the spinneret. The spun filament can be cured after wind-up or at any time before wind-up. The wind-up rate is usually about 200 to 2500 meters per minute. Usually, wind-up rates somewhat faster than the spinning speed give favorable effects to the tenacity of the resulting filament.

Known oils, or n-paraffinic hydrocarbons, etc. can be utilized as spinning oil preparations.

The melt-spun filament can be drawn at any desired time before and/or after curing. The drawing often results in desirable properties of the filament.

The drawing operation may be conducted in one stage or in more stages, and the filament can be either cold or hot drawn. In the case of a multi-stage drawing, cold drawing and hot drawing can be optionally combined. The draw ratio is also optional, and usually up to 2.5 based on the length of the undrawn filament.

The resulting continuous filament of this invention can be directly used in the form of monofilaments, multifilaments, or tows, but can also be used in the form of fibers cut to the desired lengths. Or it can be used as spun yarns either alone or in admixture with known filaments or fibers, or in the form of twisted yarns or the like. It can also be made into various filamentary structures such as knitted or woven fabrics or non-woven fabrics either alone or in admixture with known filaments. Accordingly, the present invention includes within its scope a filamentary structure in a form selected from the group consisting of fibers, yarns, knitted fabrics, woven fabrics, non-woven fabrics, felt or carpets or the like, which contains or consists of a filamentary material derived from the melt-spun drawn or undrawn flame-resistant and anti-fusing cured phenolic continuous filament comprising a novolak resin which may contain a fiber-forming thermoplastic synthetic resin, as hereinabove described.

The melt-spun drawn or undrawn flame-resistant and anti-fusing cured phenolic continuous filament has superior flame-resistant and anti-fusing properties, and has light-colored appearance, good dyeability and improved yarn properties such as tenacity and elongation. This filament can be produced within a shortened curing period, without the undesirable phenomena such as sticking and dissolution of filaments which may occur during the pre-curing or curing step. The filaments have a light-colored appearance and can easily be dyed in various colors. Therefore, the filaments can be used can find a very wide range of application, for example as interior ornaments or clothes.

The invention will be described further by the following Examples together with Comparative Examples. Tenacity (Strength) and Elongation were measured by JIS L-1074.

EXAMPLE 1 AND COMPARATIVE EXAMPLE 1 AND 2

A 500 ml separable flask equipped with a stirrer and a reflux condenser was charged with 188 g of phenol, 21 g of paraformaldehyde, 35 g of water and 0.432 g of oxalic acid, and the resulting mixture was heated up to 70°C in the course of 1 hour with stirring. Then, the mass was kept at 70°C, and 85 g of formalin containing a 37% by weight of formaldehyde was added dropwise to the mass in the course of 30 minutes. The resulting mixture was heated up to 100°C over 30 minutes and reacted at this temperature for 3 hours. After completion of the reaction, the reaction mixture was neutralized by adding 0.387 g of sodium hydroxide. The resulting novolak resin was washed 3 times with hot water. Then, the novolak resin was charged into an egg-plant-shaped flask and heated gradually at reduced pressure, and after 2 hours, the temperature was 200°C and the ammonia is 2.8% by weight, sticking of fibers occurs significantly and the treatment cannot be effected.

The following Table 1 shows changes of strength and elongation of the novolak filaments with the lapse of curing time after the filaments are pre-cured by being immersed in the aqueous solution of a mixture of hydrochloric acid and formaldehyde, and color tone of cured filaments in the above described Example 1, Comparative Example 1 and Comparative Example 2.

Table 1

| Run | Curing | Strength and elongation | | 0 | 30 | 60 | 75 | Curing time (min) 90 | 120 | 180 | 360 | 660 | 960 | Color tone of cured filaments |
|---|---|---|---|---|---|---|---|---|---|---|---|---|---|---|
| Comp. Ex. 1 | Hydrochloric acid formaldehyde | Strength (g/d) | heating in preliminary curing | | 0.51 | 0.49 | 0.54 | 0.61 | 0.78 | 1.21 | 1.73 | | 1.64 | Dark reddish brown |
| | | Elongation (%) | (25°C–90°C) | | 1.3 | 1.4 | 2.0 | 2.1 | 3.0 | 4.3 | 14.2 | | 8.3 | |
| Ex. 1 | Hydrochloric acid formaldehyde → Ammonia formaldehyde | Strength (g/d) | heating in preliminary curing | | 0.51 | 1.11 | 1.45 | 1.81 | 1.73 | 1.55 | — | | — | Light yellowish brown |
| | | Elongation (%) | (25°C–90°C) | | 1.3 | 11.3 | 26.5 | 35.5 | 31.2 | 15.1 | — | | — | |
| Comp. Ex. 2 | Ammonia formaldehyde | Strength (g/d) Elongation (%) | heating in preliminary curing (25°C–75°C) | | Measurements of strength and elongation are impossible due to sticking and dissolution | | | | | | | | | | Light yellow | pressure was 10 mmHg. The flask was kept under this condition for 1 hour to obtain a novolak resin. The resulting novolak resin had a number average molecular weight of 960, which was measured by means of a measuring apparatus for molecular weight, vapor pressure and osmotic pressure (made by Knauer Co., West Germany), and a melt viscosity of 36,000 cps at 150°C, which was measured by means of a Koka type flow tester (made by Shimazu Seisakusho).

The novolak resin obtained was melt spun at 152° to 160°C under a nitrogen pressure of 0.03 atm. by means of a spinneret having 4 holes of 2.0 mm diameter, and the spun filaments were taken up on a bobbin at a rate of 1,000 m/min.

The uncured novolak filaments obtained had an average diameter of 18.5 $\mu$, an average strength of 0.098 g/d and an average elongation of 0.54%.

The uncured novolak filaments obtained were immersed in an aqueous solution of a mixture of 17.5% by weight of hydrochloric acid and 18.5% by weight of formaldehyde at 25°C and immediately heated up to 90°C in the course of 1 hour.

One third of the pre-cured novolak filaments was left in the above described aqueous mixed solution, and heating was further continued at 95° to 97°C for 15 hours (Comparative Example 1).

Another one-third of the pre-cured filaments was washed with hot water, and then treated at 75°C for 5 hours with an aqueous solution of a mixture of 2.8% by weight of ammonia and 33.3% by weight of formaldehyde (Example 1).

Further, the remaining one third of novolak filaments was dipped in an aqueous solution of a mixture of 0.5% by weight of ammonia and 5.5% by weight of formaldehyde at 25°C and immediately heated up to 75°C in the course of 1 hour (Comparative Example 2) In this run, the reason why the concentration of ammonia selected was 0.5% by weight is that when the concentration of As seen from Table 1, in the curing treatment wherein only hydrochloric acid and formaldehyde are used, production of filaments having a high strength and elongation is difficult even when curing is effected for as long as 11 hours. On the other hand, according to the method of the present invention, filaments having high strength and elongation can be obtained by carrying out the curing treatment for about 2 hours. Further, in the curing treatment wherein only ammonia and formaldehyde are used, filaments stick or partly dissolve as the temperature is raised, and it is impossible to produce acceptable filaments.

EXAMPLE 2 AND COMPARATIVE EXAMPLE 3

A novolak resin having a number average molecular weight of 870 and a melt viscosity of 23,000 cps at 150°C was produced in the same manner as described in Example 1.

The novolak resin was melt spun at 152° to 155°C by means of a spinneret having 4 holes of 1.9 mm diameter, and taken up on a bobbin at a rate of 800 m/min to obtain novolak filaments having an average diameter of 20.5 $\mu$, an average strength of 0.105 g/d and an average elongation of 0.51%.

The resulting novolak filaments were immersed in an aqueous solution of a mixture of 17% by weight of hydrochloric acid and 17% by weight of formaldehyde at 25°C and immediately heated up to 80°C in 1.5 hours.

A part of the pre-cured novolak filaments was treated with an aqueous solution of a mixture of hydrochloric acid and formaldehyde, which had the same composition as described above, at a temperature of 60°, 80°, 95° or 105°C for 15 hours (Comparative Example 3).

The remainder of the above pre-cured filaments was washed with water at 40°C and then treated with an aqueous solution of a mixture of 2.0% by weight of ammonia and 30.6% by weight of formaldehyde at a temperature of 30°, 40°, 60°, 70°, 80°, 95° or 105°C for 5 hours (Example 2).

The following Table 2 shows changes of strength and elongation of the fibers with the lapse of curing time after the filaments were pre-cured by being immersed in the aqueous solution of a mixture of hydrochloric acid and formaldehyde in the above described curing treatments and treating temperatures.

short treating time. In this case, when the treating temperature with the aqueous solution of formaldehyde and ammonia is 40° to 105°C, the strength and elongation of cured filaments are considerably increased within a short treating time. However, when the treating temperature is 30°C, cured filaments having strength and elongation sufficient for practical use are difficult to produce. Further, when the treating temperature is Table 2

| Run | Curing | Treating Temp. (°C) | Strength and elongation | 0 | 90 | 105 | 120 | Curing time (min) 150 | 180 | 210 | 390 | 690 | 990 | Color tone of cured filaments |
|---|---|---|---|---|---|---|---|---|---|---|---|---|---|---|
| Comp. Ex. 3 | Hydrochloric acid formaldehyde | 60 | Strength (g/d) | heated up to 80°C in preliminary curing | 0.49 | 0.50 | 0.53 | 0.56 | 0.61 | 0.65 | 0.71 | 0.78 | 0.90 | Dark reddish brown |
| | | | Elongation (%) | | 1.2 | 1.7 | 1.6 | 1.4 | 1.5 | 2.4 | 2.1 | 5.1 | 5.6 | |
| | | 80 | Strength (g/d) | " | 0.49 | 0.49 | 0.50 | 0.54 | 0.65 | 1.09 | 1.21 | 1.61 | 1.31 | |
| | | | Elongation (%) | | 1.2 | 1.5 | 2.1 | 1.9 | 1.8 | 2.9 | 3.1 | 6.4 | 9.3 | |
| | | 95 | Strength (g/d) | | 0.49 | 0.51 | 0.59 | 0.71 | 0.75 | 0.86 | 1.25 | 1.79 | 1.46 | |
| | | | Elongation (%) | " | 1.2 | 1.4 | 1.8 | 3.1 | 3.0 | 3.2 | 4.4 | 13.1 | 11.1 | |
| | | 105 | Strength (g/d) | | 0.49 | 0.71 | 0.99 | 1.38 | 1.66 | 1.81 | 1.50 | 1.31 | 1.21 | |
| | | | Elongation (%) | " | 1.2 | 1.9 | 2.8 | 3.5 | 5.4 | 5.7 | 8.4 | 11.6 | 7.4 | |
| Ex. 2 | Hydrochloric acid. formaldehyde ↓ Ammonia formaldehyde | 30 | Strength (g/d) | heated up to 80°C in preliminary | 0.49 | 0.51 | 0.67 | 0.55 | 0.71 | 0.91 | 0.78 | | | light yellowish brown |
| | | | Elongation (%) | minary | 124 1.2 | 1.5 | 1.6 | 2.1 | 4.2 | 4.3 | 3.9 | | | |
| | | 40 | Strength (g/d) | | 0.49 | 0.54 | 0.79 | 0.68 | 0.96 | 1.31 | 1.11 | | | | |
| | | | Elongation (%) | " | 1.2 | 1.9 | 2.9 | 4.6 | 10.6 | 12.2 | 19.4 | | | |
| | | 60 | Strength (g/d) | | 0.49 | 0.71 | 0.86 | 1.09 | 1.31 | 1.11 | 0.95 | | | | |
| | | | Elongation (%) | " | 1.2 | 8.3 | 15.5 | 19.8 | 31.4 | 33.3 | 28.6 | | | |
| | | 70 | Strength (g/d) | | 0.49 | 0.86 | 1.15 | 1.69 | 1.66 | 1.42 | 1.20 | | | | |
| | | | Elongation (%) | " | 1.2 | 11.1 | 18.1 | 30.0 | 33.1 | 29.3 | 21.3 | | | |
| | | 80 | Strength (g/d) | | 0.49 | 0.98 | 1.39 | 1.78 | 1.61 | 1.21 | 1.05 | | | | |
| | | | Elongation (%) | " | 1.2 | 15.8 | 33.8 | 42.1 | 39.2 | 15.1 | 10.1 | | | |
| Ex. 2 | Hydrochloric acid. formaldehyde ↓ Ammonia formaldehyde | 95 | Strength (g/d) | heated up to 80°C in preliminary curing | 0.49 | 1.21 | 1.76 | 1.71 | 1.51 | 1.13 | 1.15 | | | | light yellowish brown |
| | | | Elongation (%) | | 1.2 | 21.0 | 43.1 | 12.0 | 4.8 | 6.6 | 2.9 | | | |
| | | 105 | Strength (g/d) | | 0.49 | 1.25 | 1.44 | 1.18 | 1.09 | 1.11 | 1.31 | | | | |
| | | | Elongation (%) | " | 1.2 | 19.9 | 30.5 | 5.6 | 3.9 | 3.1 | 5.2 | | | |

As seen from Table 2, when uncured novolak filaments are treated only with an aqueous solution of a mixture of hydrochloric acid and formaldehyde, it is difficult to produce cured filaments having high strength and elongation even by prolonging the treatment time. According to the method of the present invention, cured filaments of light color tone having high strength and elongation can be obtained within a short treating time. In this case, when the treating temperature with the aqueous solution of formaldehyde 125°C, not only the treating time is limited, but also commercial production of the intended fibers is difficult.

REFERENTIAL EXAMPLE 1

The uncured novolak filaments obtained in the same was as in Example 1 were immersed in an aqueous solution of a mixture of hydrochloric acid and formaldehyde by varying the concentrations of the hydrochloric acid and formaldehyde as shown in the following Table 3 at 23°C for 16 hours, and then heated up to 95°C in 7 hours. Then the filaments were washed with water.

Table 3 shows relations between the strength (g/d) of the filaments and the concentrations of hydrochloric acid and formaldehyde.

ric acid and 18% by weight of formaldehyde at 15°C for 1 hour, and then heated up to 80°C in 1 hour.

The thus pre-cured filaments had an average diameter of 17.7 $\mu$, an average strength of 0.39 g/d and an average elongation of 1.2%.

The pre-cured filaments were washed with water and then treated at 80°C for 90 minutes with an aqueous solution of a mixture of ammonia and formaldehyde in Table 3

| Concentration of formaldehyde (% by weight) | Concentration of hydrochloric acid (% by weight) | | | | | | |
|---|---|---|---|---|---|---|---|
| | 3.0 | 6.0 | 15.0 | 18.0 | 25.0 | 40.0 | 50.0 |
| 3.0 | 0.12 | — | — | 0.21 | 0.10 | — | — |
| 6.0 | 0.14 | 0.36 | 0.29 | 0.36 | 0.37 | 0.22 | 0.11 |
| 15.0 | 0.18 | 0.41 | 0.43 | 0.47 | 0.41 | 0.39 | 0.17 |
| 18.0 | 0.21 | 0.32 | 0.40 | 0.46 | 0.42 | 0.23 | 0.14 |
| 25.0 | — | 0.18 | 0.23 | 0.42 | 0.43 | 0.14 | — |
| 40.0 | — | — | 0.14 | 0.32 | 0.29 | 0.15 | — |
| 50.0 | — | — | — | 0.11 | — | — | — |

As seen from Table 3, when both of the concentrations of hydrochloric acid and formaldehyde are within the range of 6.0 to 40% by weight, strengths of the filaments are increased and handling of the filaments is easy, and moreover the filaments can be made into the various concentrations as shown in the following Table 4.

Table 4 shows relations between the strength and elongation of the novolak filaments and the concentrations of ammonia and formaldehyde.

Table 4

| Concentration of formaldehyde (% by weight) | Strength and Elongation | Concentration of ammonia (% by weight) | | | | | | | | |
|---|---|---|---|---|---|---|---|---|---|---|
| | | 0 | 0.1 | 0.2 | 1.0 | 2.0 | 6.0 | 10 | 20 | 30 |
| 0 | Strength (g/d) | 0.39 | 0.33 | 0.28 | stick or dissolve | | | | | |
| | Elongation (%) | 1.2 | 0.9 | 1.1 | | | | | | |
| 0.5 | Strength | 0.43 | 0.41 | 0.43 | 0.51 | 0.45 | 0.39 | stick or dissolve | | |
| | Elongation | 1.5 | 1.4 | 1.9 | 3.1 | 2.3 | 1.4 | | | |
| 1 | Strength | 0.41 | 0.46 | 0.93 | 0.84 | 0.49 | 0.41 | 0.38 | stick | |
| | Elongation | 1.4 | 5.2 | 8.3 | 7.1 | 3.9 | 2.7 | 2.5 | | |
| 12 | Strength | 0.41 | 0.53 | 0.82 | 1.01 | 1.21 | 0.87 | 0.77 | 0.45 | stick |
| | Elongation | 1.6 | 6.1 | 10.6 | 18.8 | 15.6 | 11.7 | 5.9 | 3.0 | |
| 20 | Strength | 0.53 | 0.61 | 1.11 | 1.52 | 1.46 | 1.44 | 1.21 | 0.99 | 0.65 |
| | Elongation | 1.7 | 5.7 | 10.6 | 39.2 | 40.5 | 31.1 | 18.6 | 7.5 | 2.1 |
| 35 | Strength | 0.49 | 0.62 | 1.05 | 1.33 | 1.76 | 1.61 | 1.28 | 0.85 | 0.67 |
| | Elongation | 1.9 | 6.1 | 13.3 | 30.8 | 42.5 | 36.3 | 15.4 | 10.4 | 4.9 |
| 45 | Strength | 0.48 | 0.54 | 0.83 | 1.31 | 1.28 | 0.82 | 0.56 | 0.41 | 0.44 |
| | Elongation | 2.1 | 4.9 | 8.7 | 18.5 | 19.6 | 13.3 | 9.6 | 3.1 | 1.8 |
| 60 | Strength | 0.45 | 0.65 | 0.71 | 1.00 | 0.81 | 0.79 | 0.51 | stick | |
| | Elongation | 1.2 | 2.3 | 4.3 | 8.7 | 10.0 | | | | |
| 70 | Strength | 0.36 | 0.39 | 0.44 | 0.56 | 0.44 | stick or dissolve | | | |
| | Elongation | 1.3 | 1.9 | 2.5 | 2.4 | 2.2 | | | | | cured filaments having high strength and elongation by the succeeding curing treatment with an aqueous solution of a mixture of a basic catalyst and an aldehyde, as shown in Example 1 and 2. However, when both of the concentrations of hydrochloric acid and formaldehyde are lower than 6.0% by weight or higher than 40% by weight, the treated filaments have low strength and further dissolve or stick.

EXAMPLE 3 m-Cresol and formaldehyde were polycondensed to prepare a novolak resin having a number average molecular weight of 1,010 and a melt viscosity of 85,000 cps at 150°C, and the novolak resin was melt spun in the same manner as described in Example 1 to obtain uncured novolak filaments having an average diameter of 17.6 $\mu$, an average strength of 0.089 g/d and an average elongation of 0.63%.

The resulting fibers were immersed in an aqueous solution of a mixture of 18.0% by weight of hydrochlo- As seen from Table 4, in the aqueous solution of a mixture of ammonia and formaldehyde, when the concentration of ammonia is 0.2 to 50% by weight and that of formaldehyde is 1 to 60% by weight, cured novolak filaments having high strength and elongation can be obtained. However, in the aqueous mixed solution, when both of the concentrations of ammonia and formaldehyde are too low, or when the concentration of ammonia is too low and that of formaldehyde is too high, fibers having high strength and elongation cannot be obtained.

Further, in the aqueous mixed solution, when the concentration of ammonia is too high and that of formaldehyde is too low or too high, fibers dissolve or stick.

EXAMPLE 4

A mixture of 90 g of the novolak resin obtained in Example 1 and 10 g of nylon-6 was melted at 250°C and melt spun in an atmosphere of nitrogen in the same manner as described in Example 1 to obtain uncured novolak filaments having an average diameter of 14.6 μ, an average strength of 0.12 g/d and an average elongation of 0.86%.

The uncured novolak filaments were immersed in an aqueous solution of a mixture of 15% by weight of hydrochloric acid and 15% by weight of formaldehyde at 18°C for 10 hours, and then heated up to 40°C in 1 hour.

The pre-cured novolak filaments were immersed in an aqueous solution of a mixture of 3.5% by weight of ammonia and 31.6% by weight of formaldehyde at 25°C, and then heated up to 90°C in 2 hours.

The cured filaments thus obtained had an average diameter of 14.6 μ, an average strength of 1.44 g/d and an average elongation of 21.6% and were infusible and flame-resistant light yellow filaments.

EXAMPLE 5

The uncured novolak filaments obtained in the same manner as described in Example 1 were immersed in an aqueous solution of a mixture of 18.0% by weight of oxalic acid and 18.0% by weight of formaldehyde for 3 hours, and then heated up to 80°C in the course of 2 hours. The pre-cured filaments were treated at 75°C for 5 hours with an aqueous solution of a mixture of 3.0% by weight of various basic catalysts and 27.0% by weight of various aldehydes as shown in the following Table 5, or with an aqueous solution containing 25% by weight of hexamethylenetetramine.

The following Table 5 shows changes of elongation (%) of the novolak filaments with the lapse of treating time in the above described solution.

Table 5

| Treatment | Treating time (min) | | | | | | |
|---|---|---|---|---|---|---|---|
| | 0 | 15 | 30 | 60 | 90 | 120 | 300 |
| Ammonia.formaldehyde | 1.6 | 9.7 | 28.6 | 33.3 | 35.8 | 21.5 | 10.6 |
| Ammonia.paraformalde-hyde | 1.6 | 10.8 | 25.4 | 34.1 | 31.9 | 23.3 | 9.5 |
| Ammmonia.benzaldehyde | 1.6 | 4.5 | 8.3 | 12.2 | 18.3 | 21.1 | 19.6 |
| Hexamethylenetetramine. paraformaldehyde | 1.6 | 8.8 | 27.6 | 31.5 | 36.6 | 28.5 | 11.8 |
| Hexamethylenetetramine | 1.6 | 7.7 | 18.4 | 28.1 | 35.1 | 30.3 | 11.2 |
| Sodium hydroxide. formaldehyde | 1.6 | 19.8 | 8.9 | 9.8 | 5.6 | 3.9 | — |
| Potassium hydroxide. formaldehyde | 1.6 | 16.5 | 17.4 | 7.5 | 4.4 | — | — |
| Calcium hydroxide. formaldehyde | 1.6 | 9.6 | 18.4 | 20.1 | 3.8 | — | — |
| Barium hydroxide. formaldehyde | 1.6 | 3.8 | 10.6 | 8.6 | 3.6 | — | — |
| Sodium hydroxide. benzaldehyde | 1.6 | 4.3 | 13.3 | 7.7 | 2.9 | — | — |

As seen from Table 5, when pre-cured novolak filaments are treated with an aqueous solution of a mixture of the basic catalyst and the aldehyde, elongations of the fibers always increase within a short time. However, when a combination of the metal hydroxide and the aldehyde is used, elongations of the filaments are apt to disperse, and the fibers sometimes dissolve partly.

What we claim:

1. A process for producing a drawn or undrawn flame-resistant and anti-fusing cured phenolic continuous filament which comprises melt-spinning an uncured novolak resin which may contain up to 40% by weight based on the total weight of a fiber-foaming thermoplastic synthetic resin selected from the group consisting of nylon resin and polyurethane resin and then curing the melt-spun filament with a curing agent in the presence of a catalyst; said novolak resin produced by the reaction of a phenol selected from the group consisting of phenol, o-cresol, m-cresol, p-cresol, 2,3-xylenol, 2,5-xylenol, 2,4-xylenol, 2,6-xylenol, 3,4-xylenol 3,5-xylenol o-ethylphenol, m-ethylphenol, p-ethylphenol, p-phenylphenol, p-tertiary butyl phenol, p-tertiary amylphenol, bisphenol A, resorcinol and mixtures thereof and an aldehyde selected from the group consisting of formaldehyde, paraformaldehyde, benzaldehyde hexamethylenetetramine, furfural and mixtures thereof; characterized by pre-curing the melt-spun filament with an aldehyde as a curing agent in the presence of an acid catalyst in a single pre-curing bath, and then curing the pre-cured filament with an aldehyde in the presence of a basic catalyst.

2. The process according to claim 1, wherein the pre-curing is carried out at a temperature ranging from about 15° to about 105°C with the concentration each of the aldehyde and the acid catalyst being kept at 6.0 to 40% by weight.

3. The process according to claim 1, wherein the curing is carried out at a temperature ranging from about 40° to about 105°C with the concentration of the aldehyde being kept at 1 to 60% by weight and that of the basic catalyst, at 0.2 to 20% by weight.

4. The process according to claim 1, wherein the acid catalyst is selected from the group consisting of hydrochloric acid, sulfuric acid, nitric acid, acetic acid, oxalic acid, formic acid, orthophosphoric acid, butyric acid, lactic acid, benzenesulfonic acid, p-toluensulfonic acid, boric acid and mixtures thereof.

5. The process according to claim 1, wherein the basic catalyst is selected from the group consisting of ammonia, ammonium hydroxide, amines, hydroxides of alkali metals, hydroxides of alkaline earth metals, carbonates of alkali metals, carbonates of alkaline earth metals and mixtures thereof.

6. The process according to claim 1, wherein the curing agent is selected from the group consisting of formaldehyde, paraformaldehyde, benzaldehyde, hexamethylenetetramine, furfural and mixtures thereof.

7. The process according to claim 1, wherein the melt-spun filament is drawn before and/or after curing and the draw ratio is up to 2.5 based on the length of the undrawn filament.

8. The process of claim 1 wherein the precuring is carried out for about 0.5 –5 hours and the concentration each of the aldehyde and the acid catalyst is kept at 15 –25% by weight.

9. The process of claim 1 wherein the curing of the precured filament is carried out by first placing the precured filament in a bath containing the aldehyde and basic catalyst at a temperature of about 15° to 40°C. after which the temperature is gradually raised from about 40° to about 105°C. at a rate of less than 50°C./hr. with the concentration of the aldehyde being kept at 1–60% by weight and that of the basic catalyst of 0.2–20% by weight.

10. The process of claim 3 wherein the curing of the precured filament is carried out for 15–90 minutes.

11. The process of claim 1 wherein the curing treatment of the precured filament is carried out in an aqueous solution of formaldehyde and ammonia at 60°–80°C. for 30–60 minutes, the concentration of the ammonia in the aqueous solution being within the range of 0.2–20% by weight and the concentration of the formaldehyde in the aqueous solution being in the range of from 1–60% by weight.

12. The process of claim 11 wherein the concentration of the ammonia is from 1–10% by weight and the concentration of the formaldehyde is from about 12–45% by weight.

13. The process of claim 1 wherein said nylon resin is selected from the group consisting of polycaproamide, poly-ω-aminoheptanoic acid, poly-ω-aminononanoic acid, polyundecaneamide, polydodecaneamide, polyhexamethylene adipamide, polyhexamethylene sebacamide, polyhexamethylene undecaneamide, polyhexamethylene dodecaneamide and copolyamides thereof.

* * * * *

UNITED STATES PATENT OFFICE
CERTIFICATE OF CORRECTION

Patent No. 3,931,386　　　　　　　Dated January 6, 1976

Inventor(s) ISAO KIMURA, et al

It is certified that error appears in the above-identified patent and that said Letters Patent are hereby corrected as shown below:

Claim 1, line 5, delete "fiber-foaming", insert -- fiber-forming --

Claim 6, line 1, after "the" insert -- aldehyde --

Signed and Sealed this sixth Day of April 1976

[SEAL]

Attest:

RUTH C. MASON
*Attesting Officer*

C. MARSHALL DANN
*Commissioner of Patents and Trademarks*